June 2, 1925.  1,540,545
J. F. DEL RIO
SPEED EQUALIZER FOR GEAR SHIFT MECHANISM
Filed Sept. 24, 1924     2 Sheets-Sheet 1
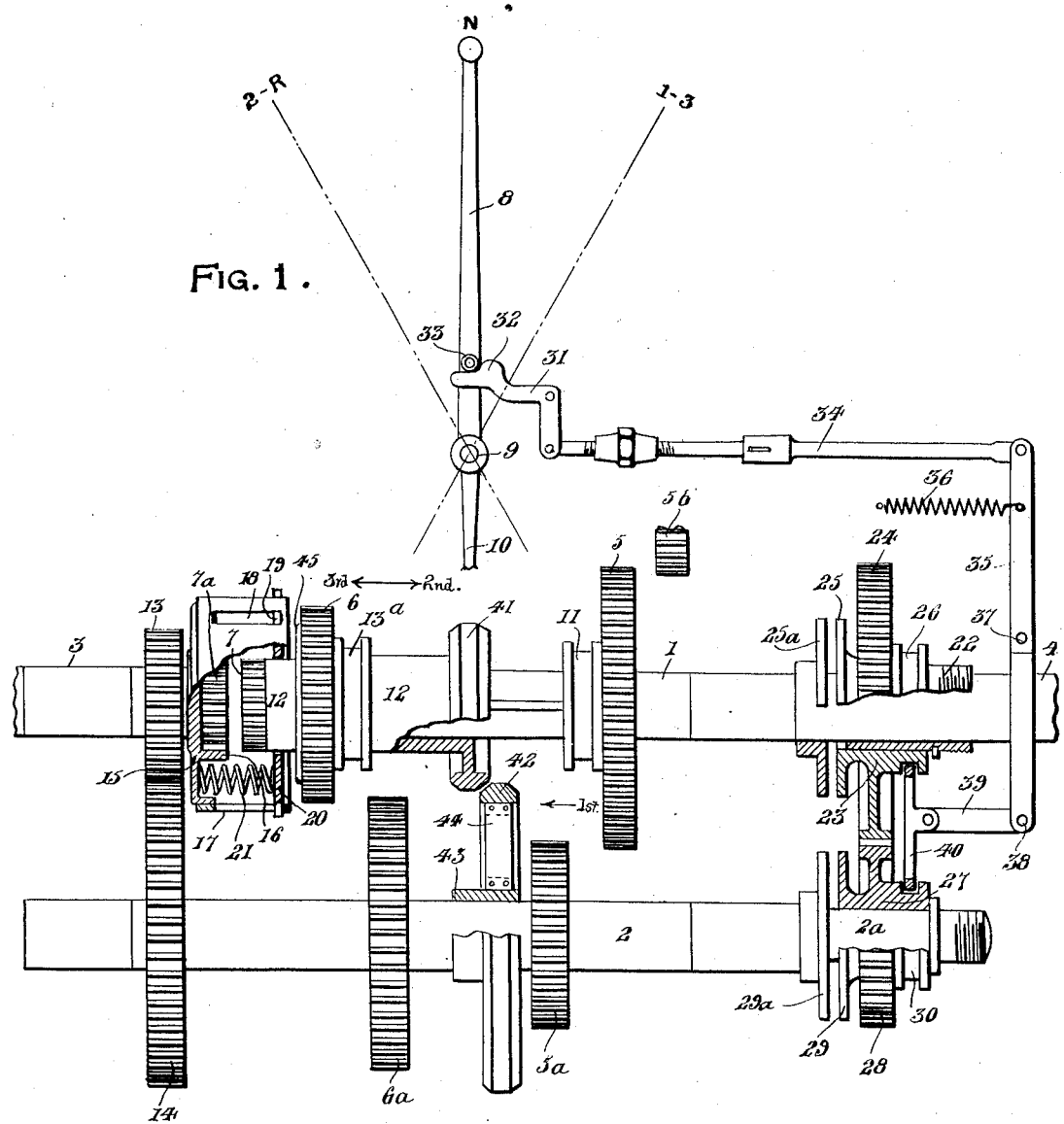
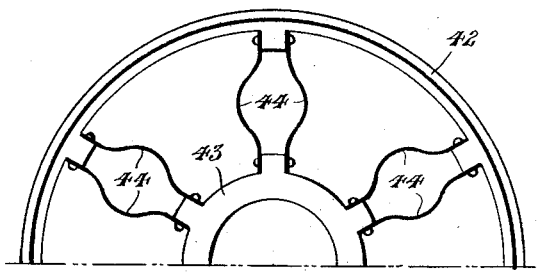
Inventor
J. F. del Rio
By
Attorney June 2, 1925.  
J. F. DEL RIO  
SPEED EQUALIZER FOR GEAR SHIFT MECHANISM  
Filed Sept. 24, 1924

Inventor  
J. F. del Rio  
By  
Attorney

Patented June 2, 1925.

1,540,545

UNITED STATES PATENT OFFICE.

JORGE F. DEL RIO, OF MEXICO, MEXICO.

SPEED EQUALIZER FOR GEAR-SHIFT MECHANISM.

Application filed September 24, 1924. Serial No. 739,616.

*To all whom it may concern:*

Be it known that I, JORGE F. DEL RIO, a citizen of the United States of Mexico, residing at Mexico city, Mexico, have invented certain new and useful Improvements in Speed Equalizers for Gear-Shift Mechanism, of which the following is a specification.

This invention relates to certain new and useful improvements in speed equalizers for gear shift mechanisms and while the device is applicable to speed changing mechanisms of various types, the primary object of the present invention is to associate the speed equalizing devices with the transmission mechanism of a motor vehicle.

The principal object of this invention is to equalize the speed of rotation of the main and counter shafts of a transmission mechanism during the act of shifting gears for the changing of speed in either raising or lowering the same to cause the associated gears for different speeds to travel at the same speed of rotation at the time of meshing engagement of the gears.

The invention more specifically includes friction devices associated with the several cooperating gears for each speed that are rendered operative prior to meshing engagement of the associated gears for equalizing the speed of rotation of the main and counter shafts of the transmission mechanism and to eliminate the racing of one gear with respect to its associated gear during the physical meshing engagement of the gears.

With the above and other objects in view as the nature of the invention is better understood, the same consists of the novel form, combination and arrangement of parts hereinafter more fully described, shown in the accompanying drawings and claimed.

Figure 2:
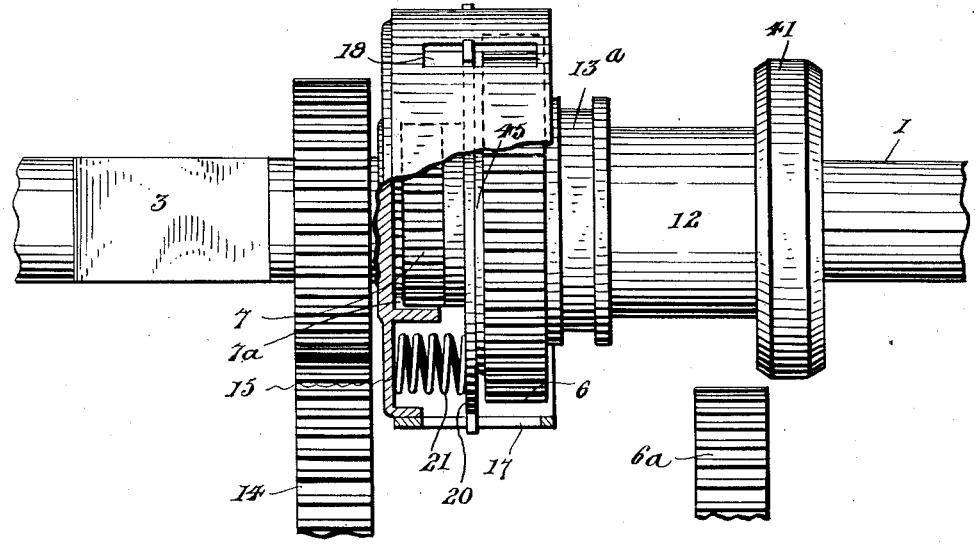
Figure 3:
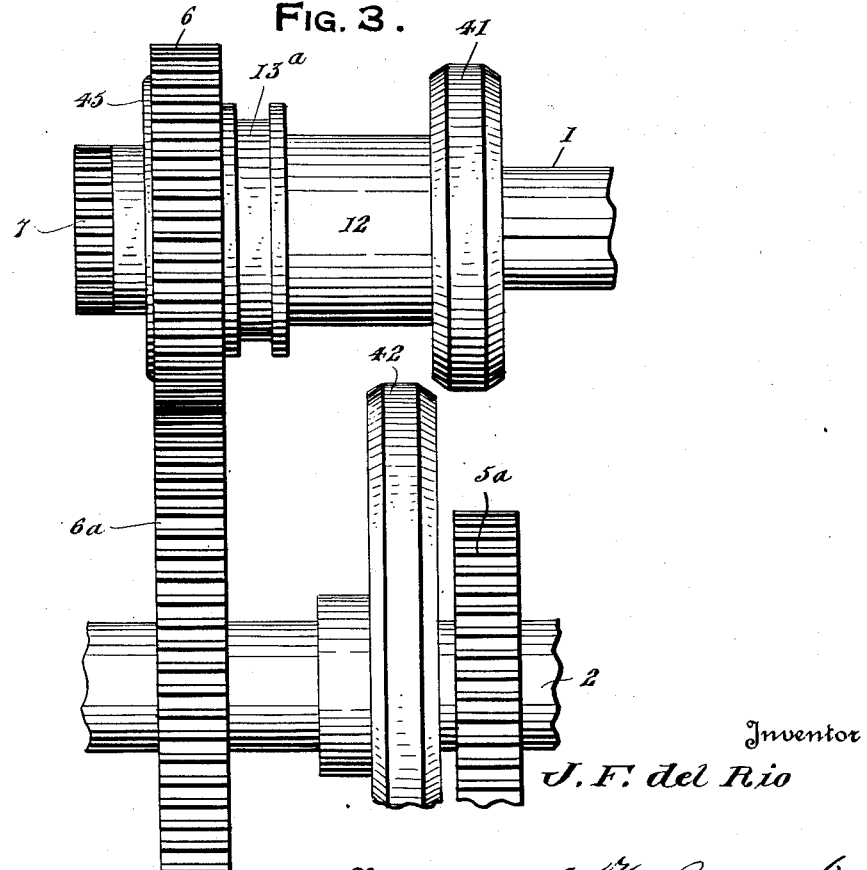

In the drawings, wherein like reference characters designate corresponding parts throughout the several views, Figure 1 is a side elevational view of a transmission mechanism showing the main shaft, the counter shaft, the associated gears for the several speeds, and the friction devices associated with each set of gears, Figure 2 is a fragmentary side elevational view, partly in section of a portion of the main shaft, and the high speed gears with the latter in meshing engagement, Figure 3 is a fragmentary side elevational view showing portions of the main and counter shafts with the gear connections between the two shafts, and Figure 4 is a fragmentary side elevational view showing the friction wheel on the counter shaft associated with the intermediate speed gears.

Referring more in detail to the accompanying drawings, and particularly to Figure 1, there is illustrated a transmission mechanism embodying a main shaft 1 and a counter shaft 2, suitable bearings being provided therefor while the forward end 3 of the main shaft 1 has a clutch connection with the engine or motor and the rear end 4 of said main shaft leads to the universal and differential mechanism.

A low speed gear 5, an intermediate gear 6, and a high gear 7 are slidable upon the main shaft 1 and are splined thereto in the usual manner. The gear shift lever 8 having its pivotal mounting 9 includes the lower operating end 10 cooperating with the several speed gears, the low speed gear 5 carrying a grooved collar 11 to effect shifting movement of the low speed gear upon the main shaft. The intermediate speed gear 6 is carried by the sleeve 12 that is splined upon the shaft 1 and has an annularly grooved collar 13ª associated therewith for cooperation with the lower end 10 of the gear shift lever to effect sliding movement of the collar 12 and gear 6 in opposite directions, it being noted from an inspection of Figure 1 that the forward end of the sleeve 12 has the high speed gear 7 forming a component part thereof.

The gear connections between the main and counter shafts include a gear 13 fixed to the main shaft section 3 and meshing with the gear 14 fixed to the forward end of the counter shaft 2, the intermediate gear 6ª and the low speed gear 5ª being fixed to the counter shaft for cooperation with the respective gears upon the main shaft. The high speed gear upon the main shaft section 3 that cooperates with the high speed gear 7 forms a component part of the cup-shaped member that includes a disk 15 fixed to the main shaft section 3 and carrying a rearwardly directed annular collar 16 internally toothed as at 7ª for cooperation with the high speed gear 7 upon the main shaft section 1. The cup-shaped member further includes an annular collar 17 secured to the peripheral edge of the disk portion 15 and said collar 17 is provided with spaced longitudinally extending slots 18 to receive the lug extensions 19 upon the friction disk 20 that is centrally apertured to accommodate the passage of the sleeve 12 and gear 7, the friction disk 20 being normally forced in a direction toward the rear side of the collar 17 by the coil springs 21.

A collar or sleeve 22 fixed to the main shaft adjacent the rear end thereof rotatably supports the hub portion 23 of a loose gear 24, the forward end of said hub 23 carrying a friction disk 25 while the rear end thereof is formed with an annularly grooved collar 26. The hub portion 27 freely rotatable upon the shaft section 2ª of the counter shaft 2, carries a gear 28 in mesh with the gear 24, the forward end of the hub 27 carrying a friction disk 29 while an annularly grooved collar 30 is carried by the rear end thereof. The friction disks 25 and 29 are freely rotatable upon their respective supporting shafts and cooperate with friction disks 25ª and 29ª that are respectively fixed to the main shaft 1 and counter shaft 2. When the friction disks 25 and 29 are shifted to engage with the cooperating friction disks 25ª and 29ª the relative speed of rotation of the main and counter shafts will be the same as their relative speeds after the meshing engagement of the first speed gears 5 and 5ª. Devices are provided and are operated by the gear shift lever 8 to cause the friction disk members to engage each other and include a bell crank lever 31 carrying an upwardly directed boss 32 upon one leg thereof that is engaged by the lug roller 33 upon the gear shift lever 8 above the pivotal mounting 9 of said lever. The other leg of the bell crank lever 31 has an adjustable rod connection 34 with the lever 35 that is tensioned by the spring 36, the lever 35 being pivotally supported as at 37 and having a pivotal connection 38 at its other end with the link 39 that is attached to the cross arm 40 that extends into the grooved collars 26 and 27 of the gears 24 and 28 respectively. The lower end 10 of the gear shift lever 8 has a connection with the grooved collar 11 associated with the first speed gear 5 and when the gear shift lever 8 is moved in the direction as indicated in Figure 1 to bring the low speed gears 5 and 5ª into meshing engagement, the bell crank lever 31 and the associated levers and links are first operated in advance of the gears 5 and 5ª to move the friction disks 25 and 29 into engagement with the friction disks 25ª and 29ª respectively, thereby causing the meshing gears 24 and 28 to cause the proper relative speed of rotation of the main shaft 1 and the counter shaft 2, continued movement of the gear shift lever 8 into its first speed position ultimately bringing into meshing engagement the low speed gears 5 and 5ª at the time that the same are rotating at a proper relative speed.

The friction members associated with the intermediate speed gears 6 and 6ª includes a friction wheel 41 carried by the rear end of the sleeve 12 that supports the shiftable gear 6 and cooperates with the friction wheel 42 that is fixed to the counter shaft 2. The friction wheel 42 is shown in detail in Figure 4 and includes a hub portion 43 fixed to the counter shaft and with spring arms 44 interposed between the hub 43 and the friction tread portion 42, so that when the friction wheel 41 moves into engagement with the friction wheel 42, the former may move into engagement with the tread portion thereof in escaping the coacting beveled faces as illustrated in Figure 1 to assume the position shown in Figure 3 after the gears 6 and 6ª are placed in meshing engagement. In shifting the intermediate gear 6 for engagement with the associated gear 6ª upon the counter shaft, the lower end 10 of the gear shift lever 8 is moved into engagement with the collar 13 of the sleeve 12, it being understood that the clutch connection between the main shaft 1 and the motor is disengaged during the act of shifting gears, the friction wheel 41 first engages the friction wheel 42 to bring about the proper relative speed of rotation of the main and counter shafts, the friction wheel 41 moving over the periphery of the friction wheel 42 and being extended to a position beyond the wheel 42 as illustrated in Figure 3 substantially at the time of meshing engagement of the intermediate speed gears 6 and 6ª.

In shifting the gears from intermediate to high speed, the operating end 10 of the gear shift lever engaging the collar 13 moves the sleeve 12 in the opposite direction upon the main shaft 1, causing the friction wheels 41 and 42 to be again engaged and to assume the full line position shown in Figure 1, continued movement of the sleeve 12 carrying the friction plate 45 into engagement with the friction disk 20 against the tension of the springs 21 and prior to the meshing engagement of the gear 7 with the gear 7ª.

It will therefore be seen that when the clutch is operated to disconnect the engine from the main drive shaft 1 of the transmission mechanism, for the purpose of shifting the gears in any direction to obtain the desired speed, for either increase or decrease, a friction device is brought into play to equalize the speed of rotation of the main and counter shafts of the transmission mechanism prior to engagement of the proper gears. In reducing this speed of rotation of the main and counter shafts from second speed to first speed, the gear connections 24 and 28 between the two shafts constitute the driving connections when the friction elements 25, 25ª, and 29, 29ª are brought into engagement. It will therefore be seen that upon shifting movement of the gears to obtain various speeds for either an increase or decrease, the main and counter shafts are caused to rotate at the same speed so that the associated gears will be properly engaged with each other and stripping of the teeth will be eliminated. The gear 5ᵇ forms the reverse gear.

While there is herein shown and described the preferred embodiment of the present invention, it is nevertheless to be understood that minor changes may be made therein without departing form the spirit and scope of the invention as claimed.

What is claimed is:—

1. In a speed equalizer for gear shift mechanism, the combination with sets of speed changing gears, a main and counter shaft supporting the same, of friction devices associated with the shafts to cause the gears of each set to rotate at the same speed at the time of meshing engagement, the friction devices for the low speed gears including meshing gears, respectively, freely rotatable on the main and counter shafts, a friction disk on each free gear, and co-operating friction disks fixed to the main and counter shafts.

2. In a speed equalizer for gear shift mechanism, the combination with sets of speed changing gears, a main and counter shaft supporting the same, of friction devices associated with the shafts and each set of gears operated in advance of the meshing engagement of the sets of gears to cause the latter to rotate at the same speed at the time of meshing engagement, the friction devices for the low speed gears including meshing gears, respectively, freely rotatable on the main and counter shafts, a friction disk on each free gear and co-operating friction disks fixed to the main and counter shafts.

3. In a speed equalizer for gear shift mechanism, the combination with sets of speed changing gears, a main and counter shaft supporting the same, of friction devices associated with the shafts to cause the gears of each set to rotate at the same speed at the time of meshing engagement, the friction devices for the low speed gears including meshing gears, respectively, freely rotatable on the main and counter shafts, a friction disk on each free gear, cooperating friction disks fixed to the main and counter shafts, a gear shift lever, and devices interposed in the path of movement of the lever from neutral to low speed position adapted to be operated for engaging the friction disks associated with the low speed gears.

4. In a speed equalizer for gear shift mechanism, the combination with sets of speed changing gears, a main and counter shaft supporting the same, of friction devices associated with the shafts and each set of gears operated in advance of the meshing engagement of the sets of gears to cause the latter to rotate at the same speed at the time of meshing engagement, the friction devices for the low speed gears including meshing gears, respectively, freely rotatable on the main and counter shafts, a friction disk on each free gear, cooperating friction disks fixed to the main and counter shafts, a gear shift lever, and devices interposed in the path of movement of the lever from neutral to low speed position adapted to be operated for engaging the friction disks associated with the low speed gears.

5. In a speed equalizer for gear shift mechanism, the combination with sets of speed changing gears, a main and counter shaft supporting the same, of friction devices associated with the shafts to cause the gears of each set to rotate at the same speed at the time of meshing engagement, the friction devices for the low speed gears including meshing gears, respectively, freely rotatable on the main and counter shafts, a friction disk on each free gear, and co-operating friction disks fixed to the main and counter shafts, the friction device for the intermediate gears including friction wheels on the main and counter shafts, one of said friction wheels embodying a spring web portion and a gear shift lever for operating the gears and friction wheels to cause engagement of the friction wheels prior to meshing engagement of the gears.

6. In a speed equalizer for gear shift mechanism, the combination with sets of speed changing gears, a main and counter shaft supporting the same, of friction devices associated with the shafts and each set of gears operated in advance of the meshing engagement of the sets of gears to cause the latter to rotate at the same speed at the time of meshing engagement, the friction devices for the low speed gears including meshing gears, respectively, freely rotatable on the main and counter shafts, a friction disk on each free gear and co-operating friction disks fixed to the main and counter shafts, the friction device of the intermediate gears including friction wheels on the main and counter shafts, one of said friction wheels embodying a spring web portion, and a gear shift lever for operating the gears and friction wheels to cause engagement of the friction wheels prior to meshing engagement of the gears.

7. In a speed equalizer for gear shift mechanism, the combination with sets of speed changing gears, a main and counter shaft supporting the same, of friction devices associated with the shafts to cause the gears of each set to rotate at the same speed at the time of meshing engagement, the friction devices for the low speed gears including meshing gears, respectively, freely rotatable on the main and counter shafts, a friction disk on each free gear, cooperating friction disks fixed to the main and counter shafts, one of the high speed gears being splined on the main shaft, the other high speed gear being supported on a shaft having a clutch connection with the source of power and said high speed gears being in longitudinal alinement, and a friction disk associated with each high speed gear adapted for contact prior to engagement of the high speed gears to equalize the speed of rotation of the gears.

8. In a speed equalizer for gear shift mechanism, the combination with sets of speed changing gears, a main and counter shaft supporting the same, of friction devices associated with the shafts and each set of gears operated in advance of the meshing engagement of the sets of gears to cause the latter to rotate at the same speed at the time of meshing engagement, the friction devices for the low speed gears including meshing gears, respectively, freely rotatable on the main and counter shafts, a friction disk on each free gear, cooperating friction disks fixed to the main and counter shafts, one of the high speed gears being splined on the main shaft, the other high speed gear being supported on a shaft having a clutch connection with the source of power and said high speed gears being in longitudinal alinement, and a friction disk associated with each high speed gear adapted for contact prior to engagement of the high speed gears to equalize the speed of rotation of the gears.

9. In a device of the type described, a main shaft, a main shaft section alined with the main shaft, means for selectively connecting the main shaft to the main shaft section for causing the same to rotate at different speeds, means for connecting the main shaft to the main shaft section for causing the same to rotate at equal speed, said last mentioned means including an internal gear fixed to the main shaft section, a sleeve splined on the main shaft, an external gear on the sleeve adapted to mesh with the internal gear, means for shifting said sleeve to intermesh said gears; means for causing the main shaft and the main shaft section to rotate at the same speed at the time of connection, said last mentioned means including a cup-shaped member fixed on the main shaft section and having longitudinal slots in its periphery, a friction disk within the cup-shaped member and having lug extensions projecting thru said slots, and a friction plate fixed on the sleeve splined on the main shaft section adapted to engage the friction disk when the sleeve is shifted to intermesh said gears.

In testimony whereof I affix my signature.

JORGE F. del RIO.